United States Patent [19]
Dalton

[11] 3,739,309
[45] June 12, 1973

[54] SOLENOID ACTUATED SWITCHING DEVICE FOR ELECTRIC MOTOR CONTROL CIRCUIT

[75] Inventor: Thomas B. Dalton, Muskegon, Mich.

[73] Assignee: Westran Corporation, Muskegon, Mich.

[22] Filed: Feb. 1, 1971

[21] Appl. No.: 111,601

Related U.S. Application Data

[62] Division of Ser. No. 2,259, Jan. 12, 1970, Pat. No. 3,593,084.

[52] U.S. Cl. .................. 335/181, 200/153 L
[51] Int. Cl.... H01h 50/18, H01h 50/64, H01h 3/42
[58] Field of Search ............... 200/153 L; 335/181, 335/140

[56] References Cited
UNITED STATES PATENTS
1,000,052   8/1911   Thordarson .................. 335/181 X Primary Examiner—Robert K. Schaefer
Assistant Examiner—Robert A. Vanderhye
Attorney—Robert C. Hauke, Ernest I. Gifford, Claude A. Patalidis et al.

[57] ABSTRACT

A solenoid actuated switching device for an electric motor control circuit for selectively connecting and disconnecting a pair of input terminals of an armature of an electric motor to a source of electrical power to selectively brake and reverse the rotation of the armature. Two solenoids move against respective sides of a pivoted arm member thereby actuating one of two switches, each having fixed and movable contacts. The first fixed contact is connected in circuit only after the first solenoid has been deenergized to retract the armature thereof, and the second fixed contact is connected only after the second solenoid has been deenergized to retract its armature.

1 Claim, 7 Drawing Figures

INVENTOR
THOMAS B. DALTON
BY Hauke, Gifford & Patalidis
ATTORNEYS

INVENTOR
THOMAS B. DALTON
BY Hauke, Gifford & Patalidis
ATTORNEYS

3,739,309

SOLENOID ACTUATED SWITCHING DEVICE FOR ELECTRIC MOTOR CONTROL CIRCUIT

RELATED APPLICATIONS

This is a divisional of application Ser. No. 2,259 filed 1/12/70, now U.S. Pat. No. 3,593,084.

DESCRIPTION OF THE PRIOR ART

In present day motor reversing and dynamic braking systems it has been a common practice to dynamically brake vehicles and the like employing prime mover electric drives by disconnecting the driving motor from the prime mover driven generator and then connecting one of the driving motor terminals to ground whereby the driving motor functions as a generator driven from an axle of the vehicle through the usual gearing, with suitable resistance dissipating the electrical energy thus developed. During the operation of the driving motor as a generator, the field of the prime mover driven generator is reduced to a minimum commensurate with no load or idling operation and the braking effect is varied by adjusting the field of the driving motor. This known procedure effectively brakes the vehicle or any other prime mover electric driven motor so utilized.

Such reversing and dynamic braking systems usually employ, in typical practice, a double-pole, double-throw current reversing switch in conjunction with two or more diodes or resistors to provide the dynamic braking. Although great skill and ingenuity have been exercised in designing these systems to eliminate unsafe operation, they are not foolproof, as some of the actuating mechanisms, such as solenoids which are typically used, may fail. During the operation of an electric motor if one of the elements in the system fails, the terminals of the armature may be accidentally grounded. In the event one of the terminals of the armature of such an electric motor is grounded, the results can be extremely hazardous to the operator or other individuals nearby as the same may very well explode. Therefore, it would be desirable to provide a motor reversing and dynamic braking system which has a fail-safe switching mechanism to insure that neither of the terminals of the armature of the electric motor are prematurely grounded.

SUMMARY OF THE PRESENT INVENTION

The present invention, which will be subsequently described in greater detail, comprises a solenoid actuated switching device for a control circuit for the dynamic braking and reversing of an electric motor in which power of a fixed polarity is applied in determinable opposite directions through first and second sets of contactors or switches to apply a reversible polarity voltage across the armature of a direct current motor which is desired to be controlled. The first and second sets of contactors or switches which control the current flow and hence the polarity at the armature are in turn actuated by first and second solenoid coils, respectively, to cause the motor to rotate in a selective direction. In a neutral position, for example, both first and second solenoid coils are in a deenergized state, and the armature of the motor is grounded through the contactors or switches to provide dynamic braking and no voltage is externally applied thereacross. According to the teachings of the invention, switch actuated by the movements of the first and/or second solenoid coils insures that neither of the terminals of the armature of the motor is prematurely grounded.

It is therefore an object of the present invention to provide a solenoid actuated switching device that insures that neither of the terminals of the solenoid armatures is prematurely grounded.

It is therefore another object of the present invention to provide a simple, reliable, comparatively inexpensive electrical control circuit for controlling the direction of rotation of a direct current motor and the dynamic braking thereof.

Other objects, advantages and applications of the present invention will become apparent to those skilled in the art when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts, and in which.

DESCRIPTION OF THE PREFERRED EMBODIMENT

Figure 1:
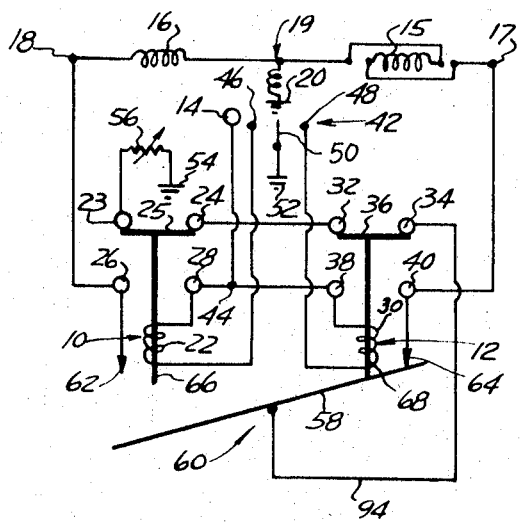
FIGS. 1, 2, 3 and 4 illustrate schematic circuit diagrams of a preferred embodiment of an electric motor control circuit.

Referring to FIG. 1 of the drawings, there is shown schematically a motor control circuit wherein relays 10 and 12 (shown in the deenergized position) are employed to respectively control the application of power from a direct current power source 14 to the clockwise rotation field coil 15 and the counterclockwise rotation field coil 16 of the armature of an electric motor generally indicated by the numeral 19. The motor has input terminals 17 and 18 respectively connected to the field coils 15 and 16 while the outputs of the two fields are grounded at 20 through the motor armature coils.

The relay 10 includes a coil 22, normally closed contacts 23 and 24, a contactor 25, and normally open contacts 26 and 28. Similarly, relay 12 includes a coil 30, normally closed contacts 32 and 34 connected by means of contactor 36, and normally open contacts 38 and 40. When either of the coils 22 or 30 is energized, the contactor 25 or 36 is moved to open the normally closed contacts 23 and 24 or 32 and 34 respectively and close the contacts 26 and 28 or 38 and 40. Coils 22 and 30 of the relays 10 and 12, respectively, are connected through a three-position switch generally indicated at 42 so that either one, but not both, may be energized by means of the direct current power from source 14 to ground through the switch. In particular, the terminals of the coils 22 and 30 are respectively connected to the contacts 28 and 38, which, in turn, are connected to the power source 14 at a common juncture 44. The other terminals of the coils 22 and 30 are respectively connected to the fixed contacts 46 and 48 of the three-position switch 42. The switch 42 has a movable contact 50 which is grounded at 52 and is movable to engage either the contact 46 or 48, or be positioned at a neutral point isolated from both contacts 46 and 48. By contacting the movable contact 50 with either the contacts 46 or 48, one of the coils 22 or 30 will be energized.

The input terminal 17 of the clockwise rotation field coil 15 and the input terminal 18 of the counterclockwise rotation field coil 16 are respectively connected to the normally open contacts 40 and 26 of the relays 12 and 10, respectively. Thus, when the contactors 25 and 36 are selectively actuated by the coils 22 and 30, current will flow from the current power source 14 through the contacts 26 and 28 or 38 and 40, respectively, to their associated rotation field coils 16 or 15. As hereinbefore indicated, the switch 42 can be actuated so as to energize only one coil 22 or 30 at one time, but not both at the same time, thus current from the power source 14 can be directed to only one rotation field coil 15 or 16 at one time.

The contact 23 is grounded at 54 through a variable resistor 56, while the contact 24 is connected to the contact 32 of the relay 12. The contact 23 may alternately be grounded directly or through a fixed resistor. Contact 34 of the relay 12 is, in turn, connected to a two-position movable arm member 58 of a two-position switch 60. The movable arm member 58 of the switch 60 is shiftable between a first position in which it engages a contact 62, which is connected to the contact 26 of the relay 10, and a second position in which the arm member 58 engages a contact 64 which, in turn is connected to the contact 40 of the relay 12. As will be explained in greater detail hereinafter in the description of the switch 60, the movable arm member 58 is adapted to contact only one of the fixed contacts 62 or 64 at one time and thus connect only one of the contacts 62 or 64 with the contact 34.

Figure 2:
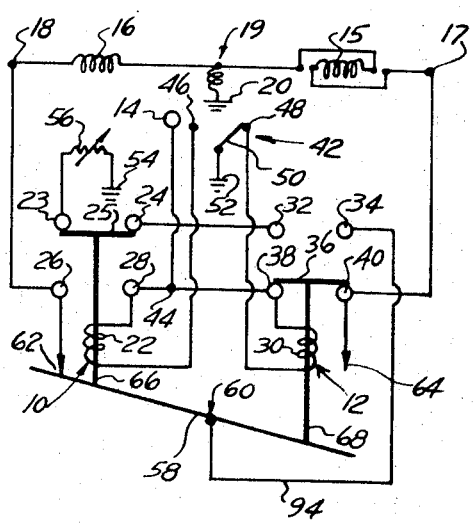

The contactors 25 and 36 of the relays 10 and 12, respectively, are actuated to open and close their associated contacts by the relay armatures 66 and 68. These same armatures 66 and 68 also actuate the movable arm member 58 of the switch 60. When the relay 10 is actuated so that the contactor 25 opens the contact 23 and 24 and closes the contact 26 and 28, the armature 66 thereof engages the movable arm member 58 of the switch 60 and causes the same to engage the fixed contact 64 (FIG. 4), and, when the coil 30 is energized so as to shift the contactor 36 to open the contacts 32 and 34 and close the contacts 38 and 40, the armature 68 thereof engages the movable arm member 58 of the switch 60 and causes the same to disengage contact 64 and engage the contact 62 (FIG. 2). According to the teachings of the invention, it should be noted that when either of the relays 10 or 12 are deenergized so that the same move to their normal position, that is engaging the contacts 23 and 24 or 32 and 34, the movable arm member 58 is not moved, as the same is only moved upon the energizing of one of the relays and contact thereof by their respective armatures 66 or 68.

Referring now to the schematic diagram illustrated in FIG. 2 for a description of the motor control circuit and how the same is activated so as to provide current from the direct current power source 14 to the field coil 15 to rotate the motor armature 19 in a clockwise direction, the movable contact 50 of the switch 42 is shifted to engage the fixed contact 48, thus power is directed from the power source 14 through the juncture 44, fixed contact 38, the coil 30 of the relay 12, and to ground 52 by way of the switch 42. Thus, the coil 30 of the relay 12 is energized to cause the armature 68 thereof to move downwardly, as viewed in the schematic diagrams, such that the contactor 36 disengages the normally closed contacts 32 and 34 and engages the normally open contacts 38 and 40 to close the same, while at the same time the armature 68 of the relay 12 engages the movable contact 58 to shift the same into engagement with the fixed contact 62. With the relay 12 energized, current flows from the direct current power source 14 through the juncture 44, closed contacts 38 and 40, to the terminal 17, and through the field coil 15 to cause a clockwise rotation of the motor armature 19. The solenoid coil 22 of the relay 10 cannot be actuated since the movable contact of the switch 42 can engage one contact thereof at a time, thus the power from the power source 14 is prevented from being transmitted to the coil 16 of the motor by the normally open contacts 26 and 28 of the relay 10.

Figure 3:
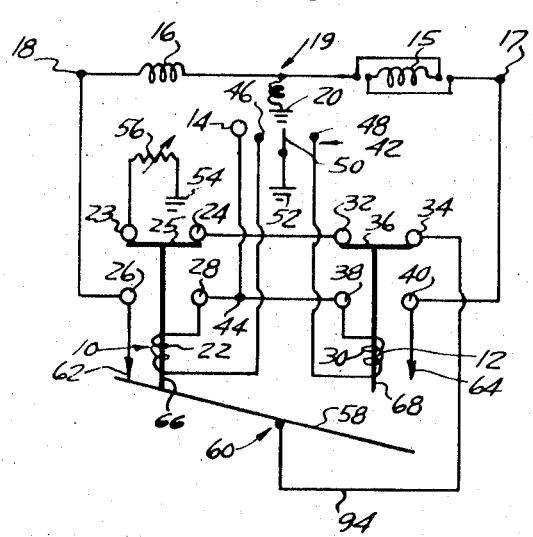

When it is desired to dynamically brake the motor armature 19, the movable contact 50 of the switch 42 is moved to its neutral position, thereby deenergizing the coil 30 of the relay 12, whereupon a spring (not shown) within the relay 12 moves the armature 68 and thus the contactor 36 back into engagement with the contacts 32 and 34, thereby breaking the direct current flow between the source 14 and the field coil 15 (see FIG. 3). When the armature 68 has been shifted to its original position by the deenergizing of the coil 30, the movable arm member 58, as viewed in FIG. 3, remains in its position, that is, in engagement with contact 62. With the motor armature rotating in a clockwise direction, an electromotive force is generated in the field coil 16. The current generated thereby is dissipated through the resistor 56. It can be seen from FIG. 3 that a flow path for dissipation of the current from the field coil 16 is created between the terminal 18 of the motor, fixed contact 26, the engagement of the contact 62 and the movable arm member 58 of the switch 60, which in turn is connected to the resistor 56 through the normally closed contacts 23, 24, 32 and 34 of the solenoid relays 10 and 12. The dynamic braking will slow down the motor 19 until it stops. The rate at which the motor 19 is slowed or stopped will depend on the amount of resistance in the resistor 56. If the resistance is large, only a small amount of current will flow through the motor and only a small amount of electromagnetic reaction will occur, and hence a relatively small braking force will be exerted on the motor armature 19. As the resistor 56 is decreased in its effective value, there is a corresponding increase in magnitude of the current flowing in the circuit for any given speed or rotation of the armature of the motor and hence providing for an increased amount of electromagnetic reaction, and thus an increased braking force is exerted upon the motor armature 19. In selected applications, a fixed resistor may be used instead of the variable resistor 56.

In order to drive the electric motor armature 19 in a counterclockwise direction, it is necessary to direct current from the power source 14 to the field coil 16. This is accomplished by moving the movable contact 50 of the switch 42 into engagement with the fixed contact 46 so as to energize the coil 22 of the relay 10, whereupon, the armature 66 thereof moves contactor 25 into engagement with the normally open contact 26 and 28 to close the same, while opening the normally closed contacts 23 and 24.

Figure 4:
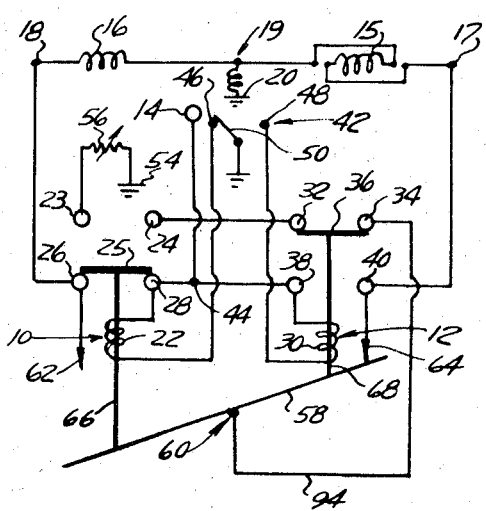

As can be seen in FIG. 4, the armature 66 of the relay 10 engages the movable arm member 58 of the switch 60 and moves the same into engagement with the fixed contact 64. Thus, current from the power source 14 is transmitted through the contacts 28, the contactor 25, contact 26, terminal 18 and the counterclockwise field coil 16 to rotate the armature of the motor in a counterclockwise direction.

When braking or stopping of the motor is desired, the movable contact 50 of the switch 42 is moved to its neutral position thereby deenergizing the coil 22. The contactor 25 is moved to its normal position by springs (not shown) into engagement with the normally closed contacts 23 and 24, as illustrated in FIG. 1, while the movable arm member 58 of the switch 60 remains in engagement with the contact 64. Thus, the electromagnetic force generated by the current flowing through the field coil 15 is dissipated through the contacts 40 and 64, the switch 60, normally closed contacts 32 and 34 of the relay 12, the normally closed contacts 23 and 24 of the relay 10, and to ground 54 through the resistor 56. In the same manner as hereinbefore described in the description of the braking of the clockwise rotation of the motor armature 19, the rate of braking can be controlled by varying resistor 56.

Figure 5:
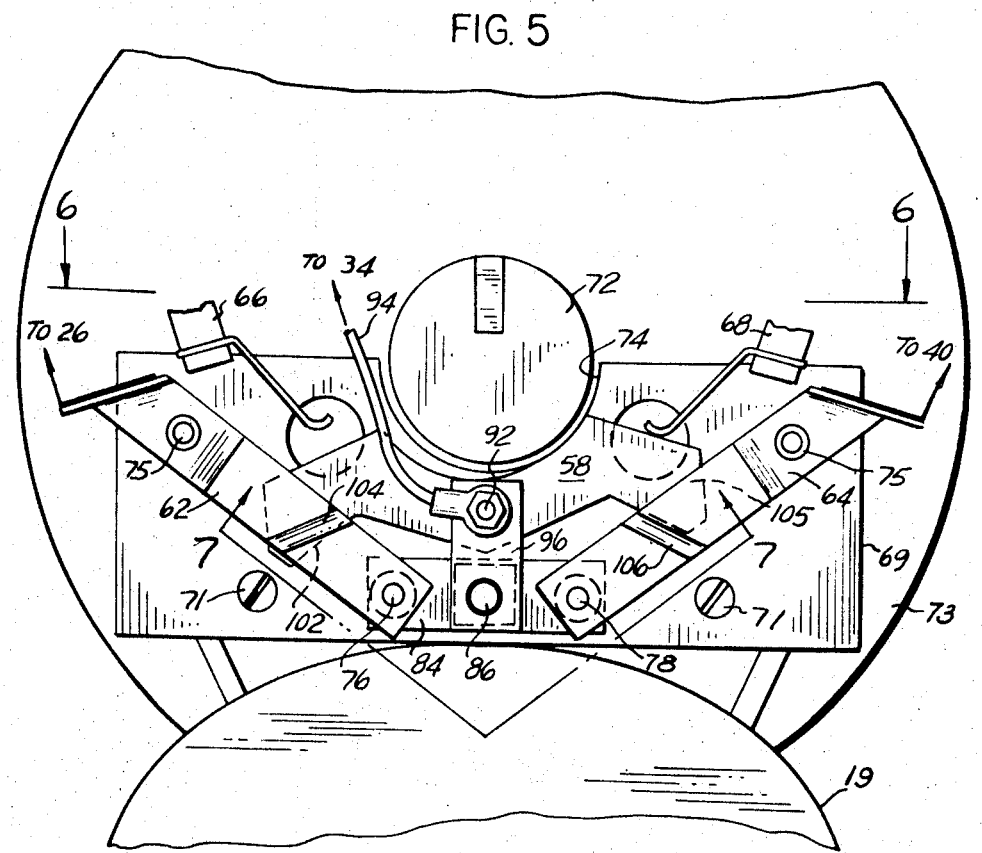
FIG. 5 is a front elevational view of one embodiment of the present invention.
Figure 6:
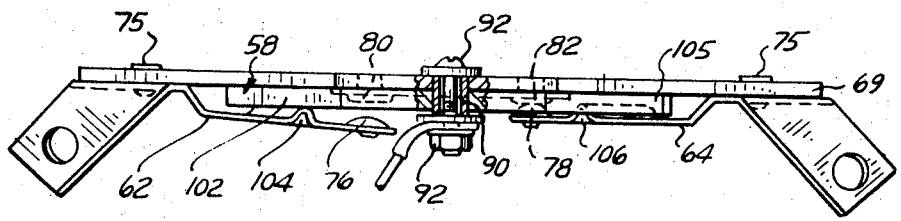
FIG. 6 is a top elevational view, partially in cross section, of the embodiment illustrated in FIG. 5.
Figure 7:
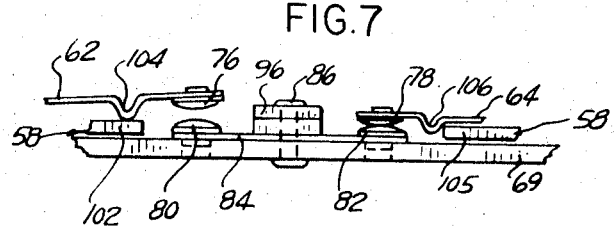
FIG. 7 is a sectional view of the embodiment illustrated in FIG. 1 and taken along the line 7—7 thereof.

Referring now to FIGS. 5, 6 and 7 for a detailed description of the switch 60, it is to be understood that the switch 60 was only illustrated schematically in FIGS. 1–4 and that the same consists of more components than were shown therein.

Switch 60 is adapted to be mounted on a plate 69 made of electrical insulating material which, in turn, is bolted to the electrical relay assembly by screws 71, such that the output shaft 72 of a gear reducer 73 on motor 19 extends through a half-round slot 74 on one edge of the plate 69. The switch 60 comprises a pair of flexible members 62 and 64 (which correspond to the contacts 62 and 64 of FIGS. 1–4), one end of each being attached to the insulating plate 69 by rivets 75. The flexible members 62 and 64, respectively, have movable contacts 76 and 78 on their opposite free ends. The flexible members 62 and 64 are of sufficient resiliency so that the contacts 76 and 68 are normally biased downwardly into engagement with fixed contacts 80 and 82 mounted on top of a transverse metal plate 84 which, in turn, is attached to the insulating plate 69 by means of rivet 86. Movable arm member 58 is rotatably mounted to the insulating plate 69 by bushing 90 and nut and bolt assembly 92. Bushing 90 insures free movement of the arm member 58 and is made of a tough insulating material which has self-lubricating characteristics, such as nylon or the like. The nut and bolt assembly 92 also fastens to the plate 69, a lead wire 94 and a connecting plate 96; the connecting plate 96 connecting the lead wire 94 to transverse plate 84 and thus to the fixed contacts 80 and 82, while lead wire 94 is connected to the normally closed contact 34 illustrated in the schematic diagrams in FIGS. 1–4. The opposite ends of flexible members 62 and 64 are respectively connected directly to the normally open contacts 26 and 40, also illustrated in FIGS. 1–4.

The arm member 58, which is also made of a non-electrical conducting material, is adapted to rotate in both a clockwise and counterclockwise direction (as viewed in FIG. 5) in response to the relay armatures 66 and 68, respectively. Thus, when the coil 22 of the relay 10 is energized so as to drive the armature 66 into engagement with the arm member 58, the armature 66 causes the arm member 58 to rotate in a counterclockwise direction whereupon an end 102 of the arm member 58 abuts a recessed portion 104 formed in the flexible member 62 to raise the same upwardly such that the contact 76 separates from the contact 80 thus breaking the connection between the contact 26 and the normally open contact 40. Since the other flexible member 64 is normally biased downwardly, the movable contacts 78 carried on its free end thereof remain engaged with the contact 82, thus the flexible member 64 is connected to the normally open contact 40 in the same manner as hereinbefore described in the description of the schematic drawings in FIGS. 1–4. When relay 10 is deenergized, the armature 66 will move away from the arm member 58. However, the arm member end 102 remains in contact with the recess 104 to prevent engagement between the contacts 76 and 80. When the coil 30 of the relay 12 is energized, the armature 68 is shifted into contact with the movable arm member 58 whereupon its end 105 thereof engages a recess 106 formed in the flexible member 64 to break the electrical connection between the contacts 78 and 82, while at the same time the end 102 of the arm member 58 is rotated clockwise away from the recess 104 of the flexible member 102 to permit the contact 76 carried on the free end thereof to engage the fixed contact 80. The circuit will then function in the same manner as herein described in the schematic drawings of FIGS. 1–4.

It can thus be seen that the present invention has provided a solenoid actuated switching device for an electric motor control system for the dynamic braking and reversing of an electric motor in a simple and reliable manner, in which the means for grounding the rotation field coils of the electric motor is such as to provide a fail-safe means for preventing a premature grounding and potential hazard to the electric motor and users thereof.

Having thus described the invention, what is claimed is as follows:

1. A switching device comprising:
   a mounting plate made of electrically insulating material a first and a second fixed contact mounted to said mounting plate;
   an arm member rotatably mounted on said plate and rotatable between first and second positions;
   first and second movable contacts normally engaging said first and second fixed contacts, respectively;
   said movable contacts being carried at one end of a pair of flexible members, the opposite ends of each of said flexible members being carried by said mounting plate,
   said flexible members being of sufficient resiliency such that said first and second movable contacts carried thereon are normally biased into engagement with said first and second fixed contacts, respectively,
   said arm member being mounted at its mid-section to said plate at a position between said pair of flexible members and so arranged that when said arm member is rotated in one direction, it engages the underside of only one of said flexible members to raise the movable contact carried thereby away from its associated fixed contact while the contact on the other of said flexible members remains engaged with its associated fixed contact, and said arm member engaging the underside of the other of said flexible members when rotated in an opposite direction so as to raise the movable contact carried thereby away from its associated fixed contact and to permit the other movable contact to be moved by its flexible member into engagement with its associated fixed contact whereby one of said pairs of contacts is always engaged while the other of said pairs of contacts is separated;

a normally closed first set of contacts and a normally closed second set of contacts connected in series and when both are closed connecting said fixed contacts with an electrical circuit;

a first solenoid operable when energized to open said first set of contacts and a second solenoid operable when energized to open said second set of contacts;

said solenoids having armatures arranged to move against said arm member such that energizing said first solenoid rotates said arm member in one direction to connect one of said fixed contacts with said first set of contacts while at the same time said first solenoid opens said normally closed first set of contacts and energizing said second solenoid rotates said arm member in an opposite direction to connect the other of said fixed contacts with said first set of contacts while at the same time said second solenoid opens said second set of contacts;

the connection between said solenoid armatures and said arm member permitting retraction of said armatures from said arm member without affecting the position of said arm member whereby said first mentioned fixed contact is connected to said circuit only after said first solenoid has been deenergized to retract the armature thereof and said second mentioned fixed contact is connected to said circuit only after said second solenoid has been de-energized to retract the armature thereof.

* * * * *

UNITED STATES PATENT OFFICE
CERTIFICATE OF CORRECTION

Patent No. 3,739,309           Dated June 12, 1973

Inventor(s)   Thomas B. Dalton

It is certified that error appears in the above-identified patent and that said Letters Patent are hereby corrected as shown below:

Column 3, line 11, preceding "current", insert --direct--.

Column 5, line 5, after "through", delete "the contacts" and insert --contact--.

Column 5, line 63, delete "a non-";
          line 64, delete "electrical conducting" and insert --an electrically insulating--.

Signed and sealed this 26th day of March 1974.

(SEAL)
Attest:

EDWARD M.FLETCHER,JR.                C. MARSHALL DANN
Attesting Officer                    Commissioner of Patents